Aug. 31, 1965
J. E. BITTER
3,203,725
COMPOSING STICK
Filed Jan. 10, 1963
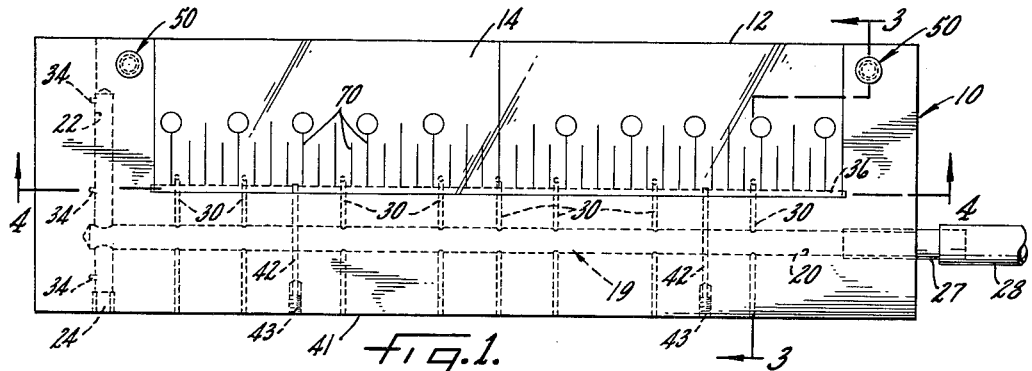
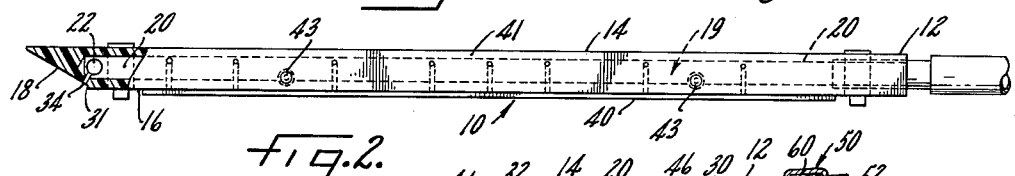
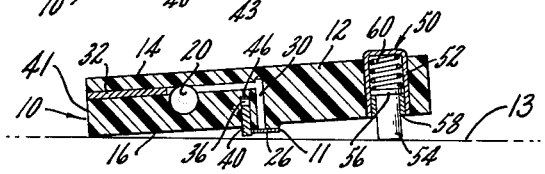
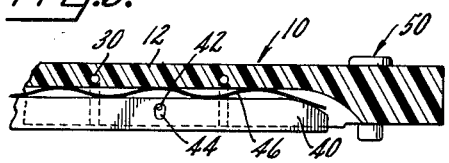
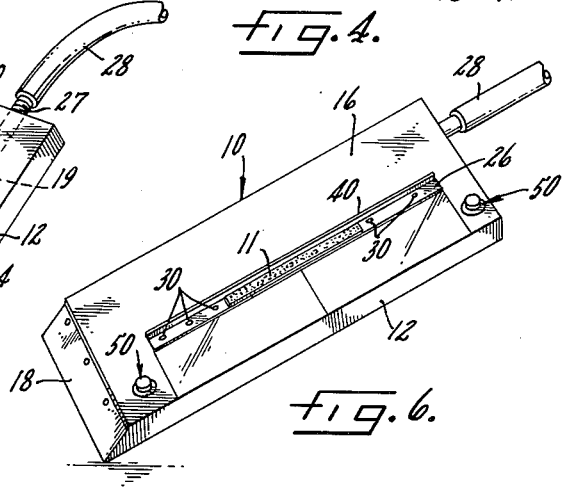
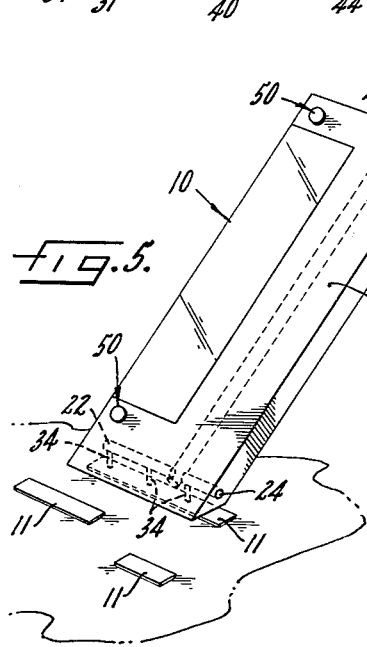
INVENTOR.
James E. Bitter,
BY
Byron, Hume, Groen & Clement
Attorneys.

United States Patent Office 3,203,725
Patented Aug. 31, 1965

3,203,725
COMPOSING STICK
James E. Bitter, 824 Elmwood Ave., West Chicago, Ill.
Filed Jan. 10, 1963, Ser. No. 250,590
9 Claims. (Cl. 294—64)

This invention relates to a composing stick for handling small pieces of sheet material, such as paper and the like, and for placing these small pieces of sheet material on a make-up page or the like.

In photocomposition-type printing, galley pages containing the printed matter are produced by printing, photo-reproduction or other similar methods. The lines of type, individual words, letters, figures and other printed matter so produced must then be cut from the galley page and pasted on a paper sheet, plastic sheet or other suitable backing means to form a make-up page. In this type of printing the make-up page simulates the ultimate page to be printed, as the make-up page is photographed and the printing plate for the page made from this photograph.

In preparing the make-up page, each line of type, printed character or other printed matter must be precisely positioned on the make-up page, as the make-up page becomes, in effect, the page as it will appear when printed. It will be understood that each galley page will contain many individual lines of type which must be properly positioned on the make-up page. This type may be extremely small and therefore the piece of printed matter may have a width of three-eighths of an inch or less, though it will be understood that the width and length of these pieces may vary considerably.

Heretofore these pieces of printed matter were glued or otherwise secured to the make-up page by hand. This is a time consuming procedure and extremely laborious when the pieces are small. Furthermore, it is difficult to properly align the pieces of printed matter on the make-up page in this manner.

It is therefore an object of the present invention to provide a means by which pieces of sheet material may be easily handled.

It is a further object of the present invention to provide a means by which pieces of printed matter may be easily handled and placed upon a make-up page.

It is a further object of the present invention to provide a composing stick for handling, positioning and placing small pieces of printed matter upon a make-up page.

It is a further object of the present invention to provide a composing stick which is adapted to pick up small pieces of printed matter for easy handling thereof.

These and other objects more apparent hereinafter are accomplished by the composing stick embodying the features of the present invention, the composing stick being adapted to pick up, position, and place pieces of sheet material upon a make-up page or the like. The composing stick is particularly adapted to handle small pieces of printed matter. As will be more apparent hereinafter, the composing stick is adapted to be movable on the make-up page to properly position the piece of printed matter before it is attached to the make-up page.

The invention, both as to its organization and method of operation, taken with further objects and advantages thereof, will be understood by reference to the following description taken in conjunction with the accompanying drawings, in which:

FIGURE 1 is a plan view of the front face of a composing stick embodying the features of the present invention;

FIGURE 2 is a side view of the composing stick of FIGURE 1;

FIGURE 3 is a cross-sectional view of the composing stick of FIGURE 1 taken along line 3—3 of FIGURE 1, the composing stick resting on a suitably supported make-up page to which a small piece of printed matter is to be attached in proper position;

FIGURE 4 is a cross-sectional view of the composing stick of FIGURE 1 taken along line 4—4 of FIGURE 1;

FIGURE 5 is a perspective view of the composing stick of FIGURE 1 picking up a small piece of printed matter or the like; and FIGURE 6 is a perspective view of the rear face of the composing stick of FIGURE 1 with a piece of printed matter thereon.

Referring to the drawings, the composing stick embodying the features of the present invention is indicated generally by reference numeral 10. The composing stick 10 is adapted to pick up, hold and position pieces of sheet material as desired. More particularly, the composing stick 10 may be used to pick-up and place a small piece 11 of printed matter on a make-up page 13. The manner in which the pieces 11 of printed matter are held on the composing stick 10 and transferred therefrom to the make-up page 13 will be more apparent hereinafter.

The composing stick 10 includes a body member 12 having a front face 14, a rear face 16, and a bevelled-end face 18. In this instance, the body member 12 is made of a transparent plastic material, such as methyl methacrylate, though it will be apparent hereinafter that only a portion of the body member 12 need be made of a transparent material, such as a suitable plastic or glass, and that the remainder may be made of a non-transparent plastic, metal or the like.

The body member 12 has a low pressure chamber therein, indicated generally by reference numeral 19, for holding pieces 11 of printed matter on the rear face 16 and/or the bevelled-end 18 of the stick 10 in a manner more apparent hereinafter. The low pressure chamber 19 includes a longitudinally extending passageway 20 and a transversely extending passageway 22 suitably bored or otherwise formed into the body member 12. The passageways 20 and 22 communicate with one another at the interior end of the passageway 20 to form the low pressure chamber 19. The exterior end of the passageway 22 is closed by a plug 24 suitably secured therein by a force fit, threaded engagement with the body member 12, or other similar means. The exterior end of the passageway 20 receives a bushing 27 or the like suitably secured therein by a force fit, threaded engagement with the body member 12, or other suitable means. A hose 28 attached to a vacuum pump (not shown) is connected to the bushing 27. In this manner, the pressure in the chamber 19 is maintained at substantially less than atmospheric pressure to provide a suction for holding the pieces 11 of printed paper on the face 16 and/or the bevelled-end face 18 of the body member 12 in a manner more apparent hereinafter.

The rear face 16 of the body member 12 has a longitudinally extending land or raised portion 26, as best seen in FIGURES 3 and 6, upon which the piece 11 of printed paper, e.g., cut from the galley sheet, will be held by virtue of a plurality of small passageways 30 communicating with the passageway 20 of the low pressure chamber 19 and extending therefrom to the face of the land 26. The passageways 30 are closed at their other ends by suitable plugs 32, as shown in FIGURE 3, which are force fitted, threaded or similarly held in the passageway 30. In this manner when a piece 11 of printed matter from a galley sheet or the like is placed on the face of the land 26, it will be held thereon by virtue of the pressure differential or suction effected by the low pressure chamber 19. It will be understood that the passageways 30 may communicate with the face of the land 26 at a variety of places and that the length and width of the land 26 may be varied depending upon the size of the piece 11 to be handled by the composing stick 10.

Likewise there are a plurality of passageways 34 communicating with the passageway 22 of the low pressure chamber 19 which terminate at the bevelled-end face 18 of the main body 12. This permits the bevelled-end face 18 to be used to pick up pieces 11 of printed paper or the like which have been cut from the galley page, as shown in FIGURE 5. It will be understood that the composing stick is manipulated by hand, the bevelled-end face 18 being moved into close proximity to the piece 11 of printed matter whereby the suction through the passageways 34 causes the piece 11 to cling to the face 18. As the piece 11, in this instance, has an adhesive surface, such as wax or the like well known in the art, on its non-printed side, a ridge 31 extending longitudinally across the bevelled-end face 18 prevents the accidental assertion of excessive pressure on the piece 11 while picking it up. This prevents the piece 11 from becoming so firmly attached to the surface that the suction from passageways 34 is ineffective to pick up the pieces 11 of printed matter.

Adjacent the land 26 is a longitudinally extending groove 36, which is shown in FIGURES 3 and 4. A retractable guide member 40 is positioned in the groove 36 to provide a reference plane upon which the piece 11 of printed paper rests when it is held on the face of the land 26. The guide member 40 is parallel to the bottom edge 41 of the body member 12 and is held in the groove 36 by pin members 42 which extend into the body member 12 and through transverse slots 44 in the guide member 40. The body member 12 has suitable holes therein to accommodate the pin members 42. The guide member 40 is biased by a sinuous spring 46, as seen in FIGURE 4, which is positioned between the guide member 40 and the back of the groove 36. In this manner the guide member 40 normally extends outwardly from the groove 36, but may be pushed inwardly against the force of the spring 46, as when the piece 11 of printed paper is being secured to the make-up page 13.

The pin members 42 have threaded heads 43 which threadedly engage the body member 12 and provides a fluid-tight seal therewith to prevent the leakage of air communication into the low pressure chamber 19, except through the small passageways 30 and 34 when they are not covered by a piece 11 of printed matter or the like.

In addition, the body member 12 has a plurality of spring-loaded pins, indicated generally by reference numeral 50, which extend outwardly from the face 16. In this instance the two spring-loaded pins 50 are located at the top corner areas of the body member 12. As seen in FIGURE 3, the spring-loaded pins 50 include an outer casing or cap 52 which is threaded, force-fitted or similarly secured in suitable holes to the body member 12. A pin 54 having an annular flange 56 is held in the cap 52 by a force-fitted bushing 58 and is biased by a small spring 60 within the cap 52 which acts against the pin 54.

In operation, a piece 11 of printed material having an adhesive side and a printed side is picked up by hand, or by the bevelled-end face 18 and then removed by hand, and placed on the land 26 of the rear face 16, the bottom edge of the piece 11 resting on the guide member 40 as shown in FIGURE 3. In this manner, if the piece 11 of printed material has been cut properly from the galley page, the line of print or the like will be parallel to the guide member 40 and the bottom edge 41 of the body member 12. The passageways 30 communicating with the low pressure chamber 19 provide the suction which holds the printed paper 11 on the face of the land 26 as shown in FIGURES 3 and 6. The printed side of printed piece 11 faces toward the front face of the body member 12 so that it is visible through the body member 12 to the worker composing the make-up page.

The composing stick 10 is then placed upon the make-up page 13, as shown in FIGURE 3, which has been placed on a desk, table, drafting board of the like. As seen in FIGURE 3, the composing stick 10 rests upon its bottom end and the spring-loaded pins 50 so that the printed paper 11 and the guide member 40 are held away from the make-up page 13. In this manner, the composing stick 10, by guiding its bottom edge 41 with a T-square or the like, may be moved over the make-up page 13, until the piece 11 is properly positioned above the location it is supposed to be placed on the make-up page 13. Once the printed piece 11 has been properly positioned, the composing stick 10 is pressed downwardly by pushing on the body member 12. This causes the pins 54 of the spring-loaded pins 50 to retract and the guide member 40 to move into the groove 36 whereby the adhesive side of the piece 11 contacts the make-up page 13. Once the composing stick 10 has been pressed down firmly, the piece 11 will adhere securely to the make-up page 13 in proper position and not be removed therefrom when the composing stick 10 is released.

As shown in FIGURE 1, the composing stick 10 has reference lines 70 imposed on the face 14 to assist in aligning the piece 11 of printed paper on the make-up page 13.

It will be understood that the spring-loaded pins 50 may be positioned in a variety of ways, so long as the paper 11 on the land 26 and the guide member 40 are kept above the make-up page 13 while the composing stick 10 is being moved vertically and horizontally to properly position the piece 11 of printed paper 28 on the make-up page 13. Furthermore, it will be understood that the composing stick 10 may also be used when the piece of printed matter does not have an adhesive backing by applying the adhesive, such as glue or the like, to the piece 11 of printed material before or after it has been placed on the land 26 of the composing stick 10.

While the embodiment described herein is at present considered to be preferred, it will be understood that various modifications and improvements may be made therein and it is intended to cover in the appended claims all such modifications and improvements as fall within the true spirit and scope of the invention.

What is desired to be claimed and secured by Letters Patent of the United States is:

1. A composing stick comprising a body member, a portion of which is transparent, said body member having a chamber therein, means communicating with said chamber for producing a low pressure therein, said body member having a passageway communicating with said chamber and an exterior side of said body member, and means biased by a spring extending from a recess in said body member, said means adapted to move in and out of said recess.

2. The composing stick of claim 1 wherein a biased guide member extends from said exterior side of said body member.

3. The composing stick of claim 2 wherein said guide member is parallel to a bottom edge of said body member.

4. A composing stick comprising a body member having a low pressure chamber therein, said low pressure chamber communicating with an exterior side of said body member, spring-biased support means extending from said exterior side of said body member, and a spring-biased guide member extending outwardly from said exterior side of said body member, said body member having a groove into which said guide member may move against the force of said spring.

5. A composing stick comprising a transparent member having a front face, rear face, bevelled-end face and a bottom edge, said member having a chamber therein, means for producing a low pressure communicating with said chamber a plurality of passageways communicating with said chamber and said bevelled-end face and rear face, said rear face having a longitudinally extending land thereon, said rear face having a longitudinally extending groove therein adjacent said land, said groove having a retractable guide member therein, said guide member being parallel to the bottom edge of said transparent member, and spring-loaded pins mounted in said member and extending outwardly of said rear face.

6. A composing stick comprising a transparent member having a front face, rear face, bevelled-end face and a bottom edge, said member having a main first passageway therein which communications with means for producing a low pressure in said first pasageway, a plurality of second passageways in said transparent member communicating with said first passageway and said bevelled-end face, said rear face having a longitudinally extending land thereon, third passageways communicating with said land and said first passageway, a longitudinally extending groove in said transparent member adjacent said land, said groove having a guide member therein, spring means in said groove biasing said guide member, said guide member being parallel to said bottom edge of said member, and spring-loaded pins mounted in said transparent member and extending outwardly of said rear face.

7. The composing stick of claim 6 wherein said bevelled-end face has a longitudinally extending ridge thereon.

8. A composing stick comprising a body member having a chamber therein, said chamber communicating with means for producing a low pressure in said chamber, a plurality of passageways communicating with said chamber and a face of said body member, said passageways communicating with said face of said body member in close proximity to a spring-biased retractable guide means mounted in said body member whereby a piece of paper or the like will be held on said face of body member on said retractable guide means, said body member having a groove into which said guide means may move.

9. The composing stick of claim 8 wherein spring means is mounted on said body member, said spring means being adapted to be depressed upon exerting force on said body member.

References Cited by the Examiner

UNITED STATES PATENTS

| 2,072,613 | 3/37 | Aynge | 276—38 |
| 2,310,995 | 2/43 | Robinson | 294—64 |

References Cited by the Applicant

UNITED STATES PATENTS

| 1,705,005 | 3/29 | Douthitt. |
| 1,813,689 | 7/31 | Weisker. |
| 2,379,279 | 6/45 | Costello. |
| 2,446,295 | 8/48 | Morrison. |
| 2,783,016 | 2/57 | Limberger. |
| 2,814,233 | 11/57 | Anander. |
| 2,956,769 | 10/60 | Sigler et al. |
| 3,010,376 | 11/61 | Johnson. |

ROBERT B. REEVES, *Acting Primary Examiner.*

ANDRES H. NIELSEN, SAMUEL F. COLEMAN,
*Examiners.*